United States Patent
Rossi et al.

(10) Patent No.: US 9,885,838 B2
(45) Date of Patent: Feb. 6, 2018

(54) FIBER OPTIC TERMINUS ADAPTER

(71) Applicant: COTSWORKS, LLC, Highland Heights, OH (US)

(72) Inventors: Nick Rossi, Cleveland, OH (US); Eugen Artemie, Mayfield Heights, OH (US); Ken Applebaum, Highland Heights, OH (US)

(73) Assignee: Cotsworks, LLC, Highland Heights, OH (US)

( * ) Notice: Subject to any disclaimer, the term of this patent is extended or adjusted under 35 U.S.C. 154(b) by 0 days.

(21) Appl. No.: 15/166,789

(22) Filed: May 27, 2016

(65) Prior Publication Data
US 2017/0212309 A1    Jul. 27, 2017

Related U.S. Application Data

(60) Provisional application No. 62/167,672, filed on May 28, 2015.

(51) Int. Cl.
*G02B 6/42* (2006.01)
*G02B 6/38* (2006.01)

(52) U.S. Cl.
CPC ......... *G02B 6/3825* (2013.01); *G02B 6/3818* (2013.01); *G02B 6/3893* (2013.01); *G02B 6/4292* (2013.01)

(58) Field of Classification Search
None
See application file for complete search history.

(56) References Cited

U.S. PATENT DOCUMENTS

| | | | | |
|---|---|---|---|---|
| 4,707,072 A | * | 11/1987 | Kraakman | G02B 6/3873 385/72 |
| 6,095,694 A | | 8/2000 | Chudoba | |
| 2004/0252948 A1 | | 12/2004 | Alcock | |
| 2014/0334778 A1 | * | 11/2014 | Walker | G02B 6/389 385/59 |

FOREIGN PATENT DOCUMENTS

WO    2008147115 A1    12/2008

OTHER PUBLICATIONS

International Search Report and Written Opinion from corresponding International Application No. PCT/US16/34599, dated Aug. 10, 2016.

* cited by examiner

*Primary Examiner* — Jerry Rahll
(74) *Attorney, Agent, or Firm* — Tucker Ellis LLP; Patrick F. Clunk, Esq.

(57) ABSTRACT

A fiber optic adapter including a housing, a deflectable member and a locking member. The housing has a longitudinal passage extending between a first opening at a first end of the housing and a second opening at a second end of the housing, and the housing is sized to fit within a fiber optic receptacle. The deflectable member is in the longitudinal passage of the housing and configured to retain a fiber optic terminus in the housing. The locking member is interfaced with the housing and is sized to fit within a retaining notch in the fiber optic receptacle to prevent separation of the housing from the receptacle. The adapter may be an in-line embedded adapter that does not introduce optical loss to optically and mechanically couple an LC receptacle and a terminus.

20 Claims, 8 Drawing Sheets

FIBER OPTIC TERMINUS ADAPTER

RELATED APPLICATION DATA

This application claims the benefit of U.S. Provisional Patent Application No. 62/167,672 filed May 28, 2015, the disclosure of which is incorporated herein by reference in its entirety.

BACKGROUND

Military, commercial avionics, and industrial networking equipment manufacturers are adopting fiber optic components for various communication applications. An exemplary communication application is to create an operative communication link between a control system and a sensor or other data collection device. The use of fiber optic links are often used to replace existing electrical (e.g., "copper") wiring architectures. Fiber optic links provide higher speed, improved electro-magnetic interference (EMI) performance, lower weight, and increased density. Other advantages of fiber optic links include higher data capacity using multiple light propagation modes. In addition, the fiber optic cable itself is protocol agnostic. Therefore, system upgrades often may be made without replacing the fiber optic cable.

Most fiber optic products are designed for the telecommunications market. But these products are generally not rugged enough to withstand the environmental factors that would adversely affect fiber optic systems in harsh operating environments where excessive vibration, shock, and debris may be present.

A vulnerable point in the fiber optic system is the interface between the fiber optic cable and an active device (e.g., an optical transceiver, an optical transmitter, an optical receiver, or a sensor that interfaces directly with the fiber optic cable). To improve this interface, fiber optic pigtails are commonly used. Pigtailing is generally accomplished by using adhesive to permanently affix the terminal end of the fiber optic cable (or connector therefor) to the active device. Conventional pigtailing raises manufacturing and servicing issues. For instance, after a conventional pigtail is put into place, if something goes wrong with the fiber optic cable, the active device, or electronics interconnected with the active device, then the entire system must be replaced since pigtails relying on adhesive cannot be effectively disconnected.

SUMMARY

To provide an in-line embedded adapter without introducing optical loss to optically and mechanically couple an "LC" receptacle (LC being short for little connector or Lucent connector) and a terminus, such as the ARINC 801 terminus, disclosed is an adapter that provides a separable mechanical connection to the receptacle while providing a secure retention of the terminus.

DETAILED DESCRIPTION

A. Definitions

As used herein, the term "fiber optic cable" refers to a cable that includes a buffered or jacketed filament. The filament is typically made of plastic or glass, and light propagates in the filament from one end to the other end, typically for the purpose of data communications.

As used herein, the term "optical transmitter" refers to an active device that converts electrical signals to optical signals, typically with a laser or light emitting diode (LED).

As used herein, the term "optical receiver" refers to an active device that converts optical input signals to electrical output signals.

As used herein, the term "fiber optic transceiver" refers to an active device that functions as both an optical transmitter and an optical receiver.

As used herein, the term "pluggable" refers to a removable interface that does not involve the use of tools (other than a user's hands) for insertion and/or extraction. Typically, a pluggable interface involves a male component that is inserted, at least in part, into a female component.

As used herein, the term "separable" refers to a removable interface that involves the use of one or more tools for insertion and/or extraction. Typically, a separable interface involves a male component that is inserted, at least in part, into a female component.

As used herein, the term "pigtail" refers to an interface of a passive fiber optic cable to an active optical component (e.g., an optical transmitter or an optical receiver), such as with a non-removable adhesive.

B. Separable Locking Fiber Optic Adapter

Figure 1:
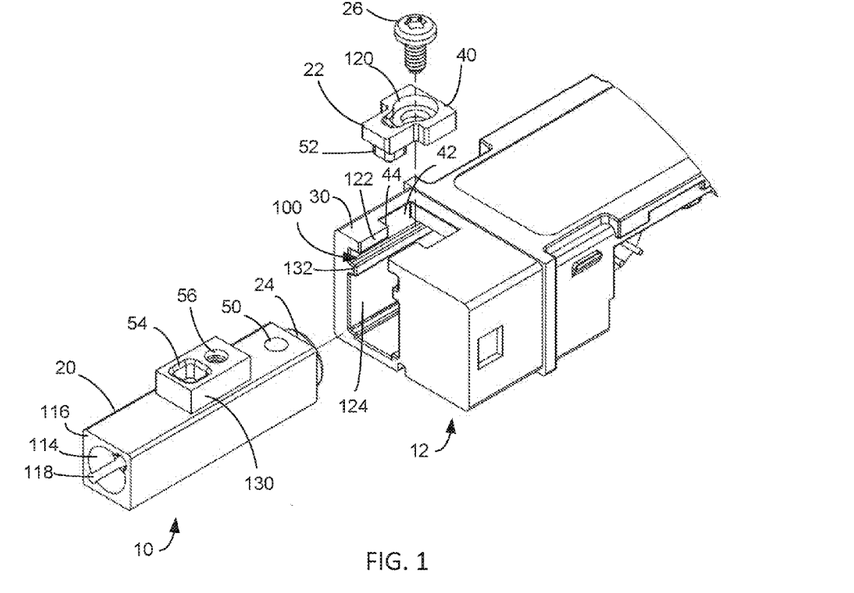
FIG. 1 is an exploded perspective view of a representative embodiment of a locking fiber optic terminus adapter and coordinating receptacle.
Figure 2:
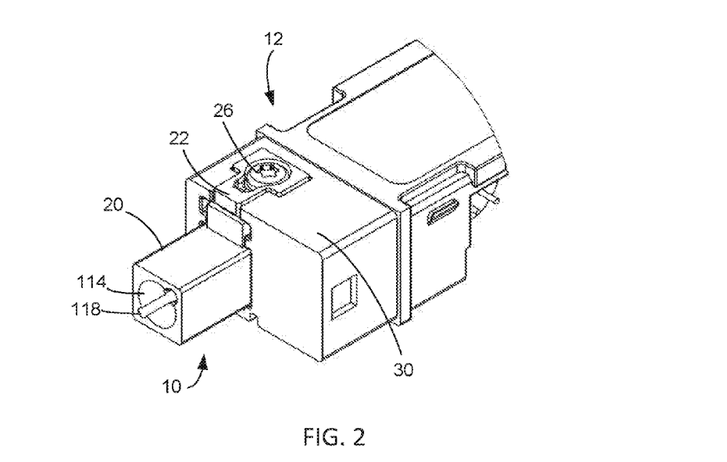
FIG. 2 is a perspective view of the locking fiber optic terminus adapter assembled with the coordinating receptacle.

Referring to FIGS. 1 and 2, a representative embodiment of a separable locking fiber optic adapter 10 and an LC receptacle 12 are shown. The figures are not necessarily to scale. Features that are described and/or illustrated with respect to one embodiment may be used in the same way or in a similar way in one or more other embodiments and/or in combination with or instead of the features of the other embodiments.

Figure 4:
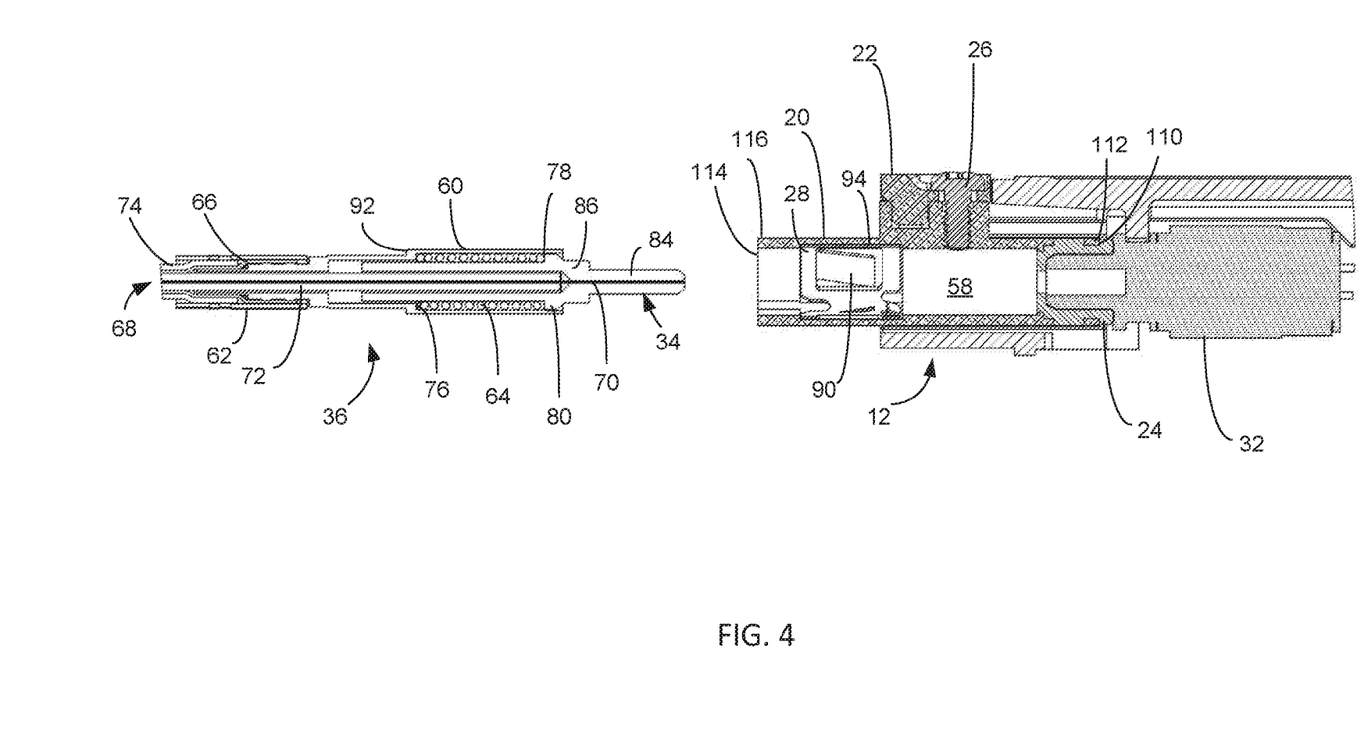
FIG. 4 is a cross-section of the terminus, adapter and receptacle taken along the line 4-4 in FIG. 3.
Figure 5:
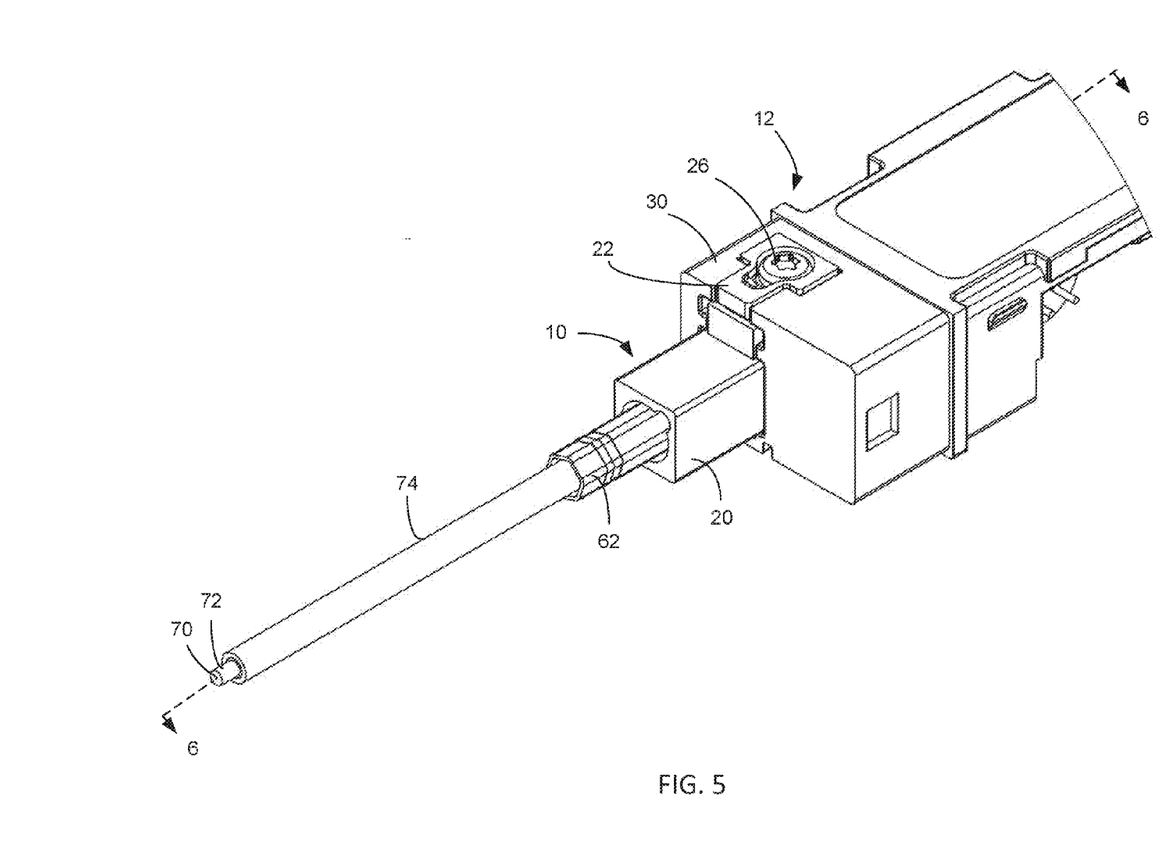
FIG. 5 is a perspective view of the fiber optic terminus assembled with the adapter and the adapter assembled with the coordinating receptacle.

The fiber optic adapter 10 includes one or more of the following components: an adapter body 20 (also referred to herein as a housing), a tongue 22 (also referred to as a locking member), a gasket 24 (also referred to as a sealing member), a securing member 26 (e.g., a fastener that is represented by a screw in the illustrated embodiments), and a spring clip 28 (shown in FIG. 4).

It will be understood to those of ordinary skill in the art that some artisans use the term "terminus" for the terminal end connecting assembly of a fiber optic cable and other artisans use the term "connector" for the same or similar connecting assembly. This largely depends on the application (e.g., artisans in telecommunications typically use the term connector and artisans in the military and avionics fields typically use the term terminus). For purposes of this document, the term connector and terminus have the same meaning.

The adapter 10 is sized and shaped to coordinate with and fit into the geometry of the LC receptacle 12. Hence, the adapter 10 may be considered a male component of a separable interface and the receptacle 12 may be considered a female component of the separable interface. The receptacle 12 is defined by a housing 30 for an optical component 32 (shown in FIG. 4). As will be discussed in detail below, a ferrule 34 (shown in FIG. 3) of a fiber optic terminus 36 held by the adapter 10 interfaces with the optical component 32. The optical component 32 may be an active device as described above or a passive optical element (e.g., another fiber optic cable or an optical coupler). The housing 20 is radially stable in the receptacle 12 so as to have little or no movement relative to the receptacle 12 in directions transverse (e.g., orthogonal to) a longitudinal axis of the housing 20 (e.g., the adapter body 20 has little or no movement relative to the receptacle 12 in the lateral and vertical directions relative to the receptacle 12). The housing 20 is also rotationally stable in the receptacle 12 so as to have little or no rotational movement relative to the receptacle 12. "Little" movement refers to movement that is less than an amount that would cause disruption to the operation of the optical system, even during extreme mechanical stresses such as vibrations and shocks experienced in manufacturing systems, military or commercial aircraft (planes and helicopters), watercraft or land vehicles, or similar environments.

The locking member 22 provides axial (e.g., along the longitudinal axis of the housing 20) stability to the adapter 10 so that the adapter has no or little rearward movement relative to the receptacle 12. At a minimum, a portion 40 of the locking member 22 that fits in a latch area chamber 42 of the housing 30 contacts a rearward shoulder wall 44 of the chamber 42. In some cases, depending on the relative sizing of the portion 40 and the chamber 42, the locking member 22 further provides axial stability to the adapter 10 so that the adapter has no or little forward movement relative to the receptacle 12.

Figure 6:
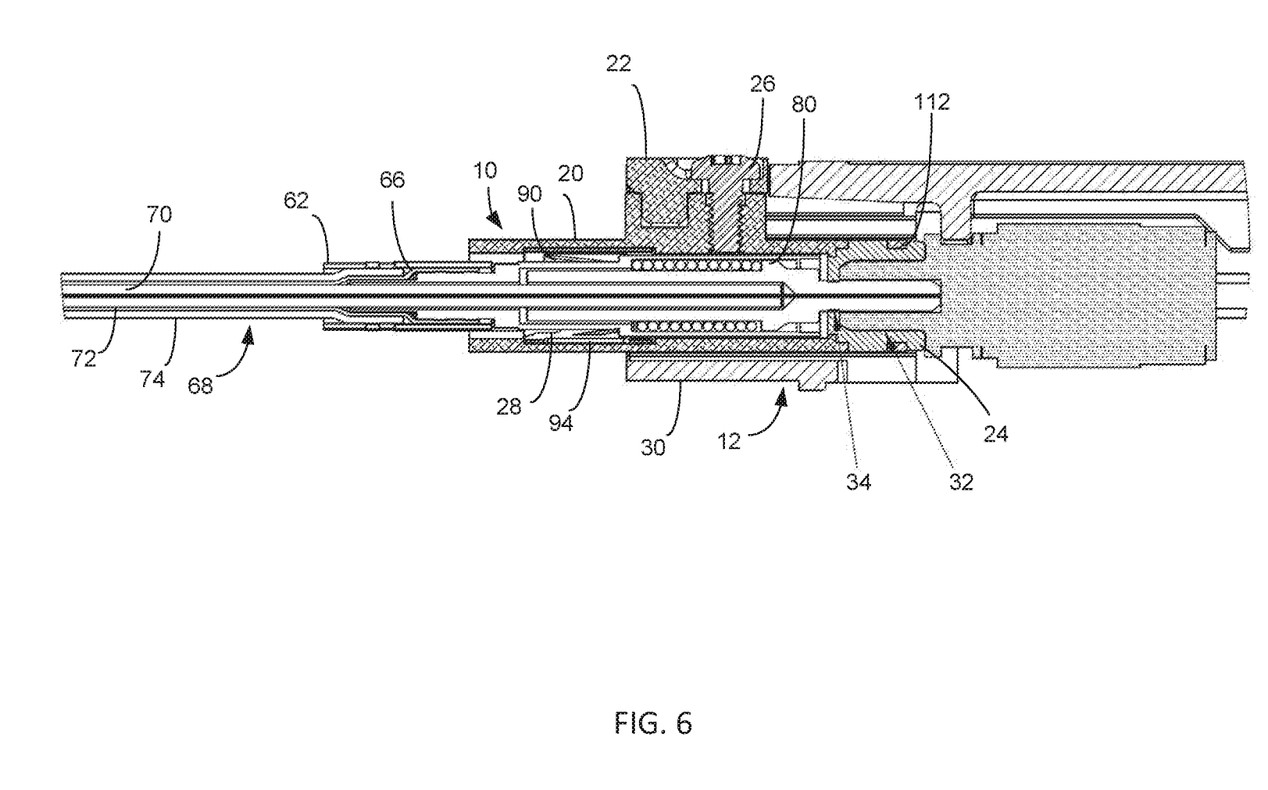
FIG. 6 is a cross-section of the terminus, adapter and receptacle taken along the line 6-6 in FIG. 5.

The sealing member 24 is an environmental sealing member that seals an optical path between the ferrule 34 of the fiber optic terminus 36 and the optical component 32 located in the housing 30. The sealing member 24 is secured to the terminal end of the adapter body 20 in any suitable manner. For example, the sealing member 24 may be over-molded on the body 20 as best shown in FIG. 6 such that most of the sealing member 24 is disposed within the body 20 while a portion of the sealing member 24 extends past the terminal end of the body 20 and a portion extends radially outward into one or more openings 50 in the body 20. The sealing member 24 minimizes the chance that contamination (e.g., dust, moisture, oil, hydraulic fluid, etc.) enters the optical path and disrupts operation of the optical system.

The securing member 26 secures the locking member 22 to the housing 20 and allows for the separable interface between the adapter 10 and the receptacle 12. Each of the securing member 26 (the screw in the illustrated embodiment), the locking member 22 and the housing 20 are separate components that are assembled to establish the interface between the connector 10 and the receptacle 12. In another embodiment, the securing member 26 is a captive screw that is joined with the locking member 22. Other exemplary securing members 26 include, but are not limited to a rivet, a member that is interference press fit into the housing 20, a swaged element(s), adhesive, etc. In one embodiment, the locking member 22 includes an alignment and strengthening post 52 that is received by a coordinating receptacle 54 in the housing 20. In the illustrated embodiment, a threaded opening 56 in the housing 20 receives the securing member 26. The threaded opening 56 is shown as a through hole that extends from a surface of the adapter body that engages against the locking member 22 to a longitudinal passage 58 (shown in FIG. 4) extending through the housing 20. In this embodiment, the securing member 26 is short enough to avoid contact and interference with the fiber optic terminus 36. In another embodiment, the opening 56 is a blind opening.

Figure 3:
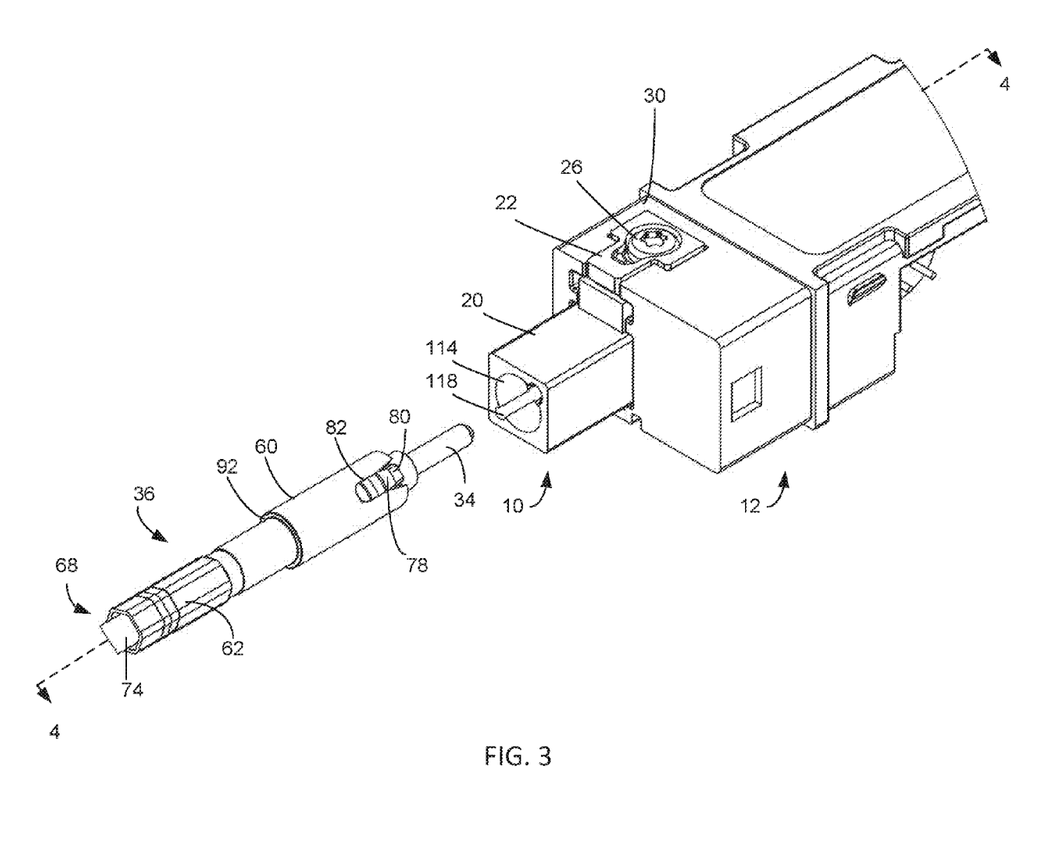
FIG. 3 is a perspective view of a fiber optic terminus and the locking fiber optic terminus adapter assembled with the coordinating receptacle.

Referring now to FIGS. 3 and 4, the fiber optic terminus 36, which may be an ARINC 801 terminus, may include one or more of the following components: a ferrule 34, a terminus body 60 (also referred to herein as a housing), a crimp ring 62 (also referred to as a crimp sleeve), a spring 64, fiber optic strength members 66, and a fiber optic cable 68.

The crimp sleeve 62 provides a crimp area for the fiber optic strength members 66 (if part of the fiber optic cable 68). The strength members 66 may be, for example, KEVLAR fibers that surround a fiber optic filament 70 of the fiber optic cable 68. In a typical arrangement for the fiber optic cable 68, the fiber optic cable 68 includes the fiber optic filament 70, which includes a core and cladding and has been coated with one or more coating layers 72. In the illustrated embodiments, the coating 72 is partially stripped from the fiber optic filament 70. In the typical arrangement for the fiber optic cable 68, the fiber optic cable 68 also includes the strength members 66 that surround the coated fiber optic filament 70 and one or more jacketing layers 74 (also referred to as a jacket) that, in turn, surround the strength members 66.

The terminus body 60 has an inner shoulder 76 that functions as a mechanical stop for the spring 64 to facilitate generation of a spring force against the fiber optic filament 70. The terminus body 60 also provides a surface against which the crimp sleeve 62 is crimped. The strength members 66, if present, may be bound between the terminus body 60 and the crimp sleeve 62.

The spring 64 urges the ferrule 34 in a forward direction. The forward direction refers to a direction along the longitudinal axis of the fiber optic cable 68 and toward the optical component 32. The ferrule 34 is connected to the filament 70 and/or the coating 72 (e.g., with adhesive). Therefore, the action of the spring 64 urges the leading end of the filament 70 forward to make operative contact with the optical component 32 that is in the housing 30. The spring 64 provides the proper force for reliable operable connection of these components. The spring 64 acts against a rearward surface 78 of the ferrule 34, which may be a rearward surface of one or more radially outwardly extending members 80 that move through respective slots 82 in the terminus body 62. In one embodiment, the ferrule 34 is of unitary construction having a sleeve portion 84 that surrounds the filament 70 and a ring portion 86 having the radially outwardly extending members 80. In another embodiment, the ring portion 86 is a separate component from the sleeve portion 84.

The spring clip 28 is secured in the longitudinal passage 58 and includes one or inwardly biased deflectable fingers 90 that are configured to be urged radially outward by the terminus body 60 when the fiber optic terminus 36 is inserted through the longitudinal passage 58. As the terminus body 60 moves through the passage 58, the fingers 90 move radially inward to engage a rearward ledge 92 of the terminus body 60. The ledge 92 servers as a stop to prevent the fiber optic terminus 36 from being removed from the adapter 10. Moreover, a tool may be used to disengage the fingers 90 from the ledge 92, which allows the terminus body 60 to be removed from the adapter 10. The spring clip 28 may be a c-shaped clip that snaps into a slot 94 in an inner wall of the housing 20 that defines the passage 58 to secure the spring clip in the passage 58.

Turning now to FIGS. 3-6, an exemplary assembly process for the adapter 10 and LC receptacle 12 may include placing the housing 20 into the housing 30. The locking member 22 is then inserted into a retaining notch 100 of the housing 30. The locking member 22 is then secured to the housing 20 using the securing member 26 (e.g., threading the securing member 26 into the opening 56). The fiber optic terminus 36 may then be fed through the longitudinal passage 58 of the housing 20 until the terminus 36 is secured in the passage 58 by the spring clip 28 and the ferrule 34 is received in a bore of the optical component 32. The ferrule 34 is moved against the spring 64 to make operative contact with the optical component 32.

A result of the assembly is to establish an in-line embedded adapter without introducing optical loss, and to establish a separable, mechanical connection between the adapter 10 and the receptacle 12. Typical female to female adapters, male to male adapters, male to female adapters and connector/termini type changing adapters introduce optical loss by incorporating at least one additional passive optical component (e.g., fiber or coupler) and related interfaces in the optical path between the fiber optic cable and the optical component 32. The optical and mechanical interface between the fiber optic terminus 36 and the receptacle 12 is ruggedized, but based on industry standard components (e.g., the LC receptacle and the ARINC 801 terminus). In addition, the assembly process will be understandable to those trained in coupling optical fibers. Although described in the context of an LC receptacle, aspects of the disclosed adapter 10 may be employed in other contexts such as, but not limited to MT connectors, SC connectors, FC connectors, or ST connectors. Also, aspects of the disclosed adapter 10 may be extended to duplex adapters or higher-order adapters.

Additional aspects and details of the adapter 10 will now be described. The adapter 10 includes the housing 20 having the longitudinal passage 58 extending between a first opening 110 at a first end 112 of the housing and a second opening 114 at a second end 116 of the housing. The passage 58 includes one or more notches 118 extending at least partially along the length of the passage that serve as guides for the radially outwardly extending members 80 of the fiber optic terminus 36 as the terminus is moved through the passage 58. The housing 20 is sized to fit within a fiber optic receptacle 12 that, in one embodiment, is an industry standard fiber optic receptacle 12. The locking member 22 is a separate part from the housing 20. The locking member 22 is sized to fit within the retaining notch 100 in the fiber optic receptacle 12. The locking member 22, when secured to the housing 20, engages with the retaining notch 100 to prevent separation of the housing 20 from the receptacle 12.

As indicated, the fiber optic adapter 10 includes the securing member 26. The securing member 26, in one embodiment, is in the form of a fastener that secures the locking member 22 to the housing 20. The securing member 26 may be, for example, a threaded fastener that engages the coordinating threaded opening 56 in the housing 20. In other embodiments, the locking member 22 includes a securing member 26 that is press fit into a coordinating receiving opening in the housing 20 to secure the locking member 22 to the housing 20.

In some embodiments, the locking member 22 includes a post (e.g., the alignment and strengthening post 52) that fits within the coordinating opening 54 of the housing 20. The post 52 may be in addition to the securing member 26 that secures the locking member 22 to the housing 20. The locking member 22 may include a recess 120 (e.g., a countersink) to accommodate a head of the securing member 26 so that an upper surface of the securing member 9 does not radially extend substantially beyond an upper surface of the locking member 22.

In some embodiment, such as but not limited to when the receptacle 12 is an LC receptacle, the retaining notch 100 is "T" shaped. The "T" shaped retaining notch 100 includes a leg 122 and the rectangular head chamber 42 that is wider than the leg 122. The leg 122 spaces the head chamber 42 apart from an opening 124 of the receptacle 12 into which the housing 20 fits. The rearward boundary wall 44 of the head chamber 42 proximal the opening 124 of the receptacle 12 may be considered a shoulder against which the locking member 22 engages. For instance, the locking member 22 is sized to fit in the head chamber 42 and engage against the shoulder 44. In one embodiment, the locking member 22 need not have a portion that fits in the leg 122. In other embodiment, the locking member 22 includes a first portion that fits in the head chamber 42 and engages against the shoulder 44 and a second portion that fits within the leg 122. It will be recognized that the shoulder 44 functions as a mechanical stop for the locking member 22 to prevent rearward movement of the locking member 22 relative to the receptacle 12. Because the locking member 22 is secured to the housing 20, the shoulder 44 may be further considered a mechanical stop for the fiber optic adapter 10 as a whole to prevent rearward movement of the fiber optic adapter 10 relative to the receptacle 12.

The housing 20 has a cross-sectional size and shape that coordinates with the receptacle 12. For instance, in the illustrated embodiment, the housing is generally rectangular in cross-section and, on one side thereof, includes a mesa 130. In this embodiment, the locking member 22 engages against the mesa 130 when secured to the housing 20. The sides of the mesa 130 are configured to abut alignment guides 132 of the receptacle 12 to be guided during insertion such that optical alignment of the fiber optic filament 70 in the receptacle 12 is achieved with the ferrule 34. In an embodiment, the mesa 130 may define slots that coordinate with the alignment guides 132, and the guides may loosely fit in the slots.

As indicated, the fiber optic terminus 36 may include the ferrule 34 that secures to a fiber optic filament 70 of a fiber optic cable 68. When connected to the fiber optic adapter 10 via the spring clip 28, the ferrule 34 is disposed in part in the longitudinal passage 58 and extends out of the housing 20 through the first opening 110 at the first end 112.

The fiber optic terminus 36 may further have a crimp sleeve 62. In one embodiment, strength members 66 of the fiber optic cable 68 are bound between the jacketing layers 74, housing 20 and the crimp sleeve 62. The fiber optic terminus 36 further comprises the spring 64 interposed between rearward surface 78 of the ferrule 34 and the inner shoulder 76 of the terminus body 60. In this arrangement, the spring 64 urges the leading end of the fiber optic filament 70 in a forward direction, which is a direction along the longitudinal axis of the housing 20 from the second end 116 to the first end 112 and toward the optical component 32. In one embodiment, the housing 20 does not limit forward travel of the ferrule 34.

In one embodiment, the locking member 22 is not deformable under ordinary conditions, including high levels of shock and vibration resulting from use in military or industrial environments. For instance, the locking member 22 is non-resilient (e.g., is not capable of freely returning to a previous position or shape in the manner that a plastic deformable latch is for a conventional LC connector). In one embodiment, the locking member 22 and/or the housing 20 are made from metal, such as aluminum, stainless steel, or any other suitable metal. In other embodiments, the locking member 22 and/or the housing 20 are made from high density plastic.

In one embodiment, the adapter 10 is separable from the receptacle 12 by un-securing the locking member 22 from the housing 20 and sliding the housing 20 from the receptacle 12. In this manner, interface of the adapter 10 with the receptacle 12 (and fiber optic cable 68 with optical component 32) is not permanent as is typical if conventional pigtailing with adhesive were in a conventional LC receptacle.

Prevention of separation of the housing 20 from the receptacle 12 is accomplished without a resilient latch member. For example, the housing 20 does not include a resilient latch member secured thereto or integral therewith that interacts with the receptacle 12.

In one embodiment, the fiber optic adapter 10 includes a sealing member 24 that forms an environmental seal between the first end 112 of the housing 20 and the optical component 32 and between the ferrule 34 and the optical component 32. The optical component 32 may be, for example, an active optical sub-assembly (e.g., a transmitting optical sub-assembly (TOSA) or a receiving optical sub-assembly (ROSA)) or a passive optical component (e.g., another fiber optical cable).

It will be appreciated that a duplex adapter will include a housing 20 that has two longitudinal passages 58 for respective fiber optic cables 68 and associated terminus bodies 60 and at least one locking member 22 and at least one securing member 26.

Turning now to FIGS. 7-13, illustrated is a second exemplary embodiment of the adapter 210. Features in the second exemplary embodiment that are similar to features in the first exemplary embodiment are given the same reference numbers but indexed by 200. Also, for the sake of brevity, functional and structural aspects of the various features that are the same in both exemplary embodiments will not be repeated in detail.

Figure 7:
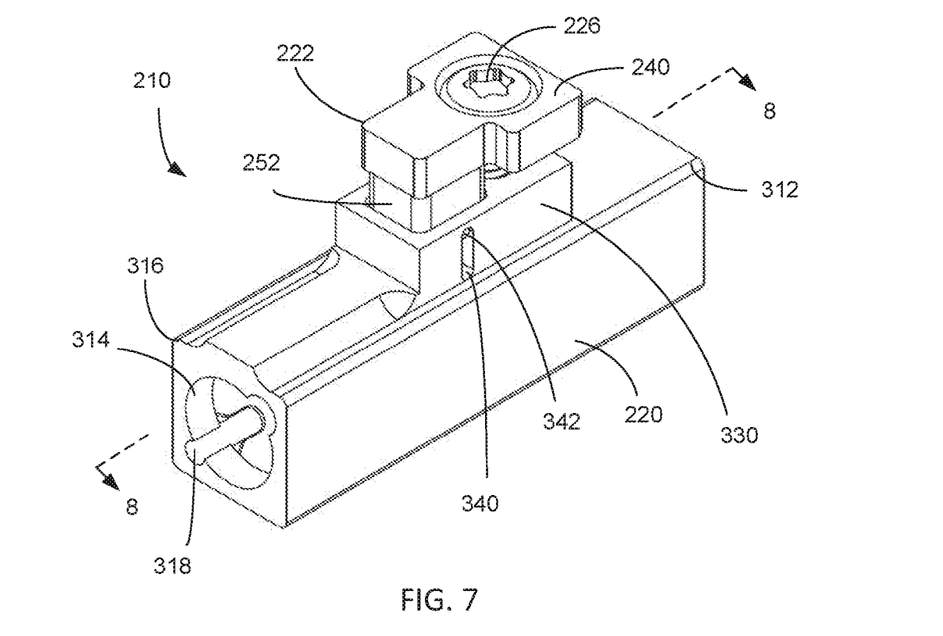
FIG. 7 is a perspective view of another representative embodiment of a locking fiber optic terminus adapter in a default state.
Figure 8:
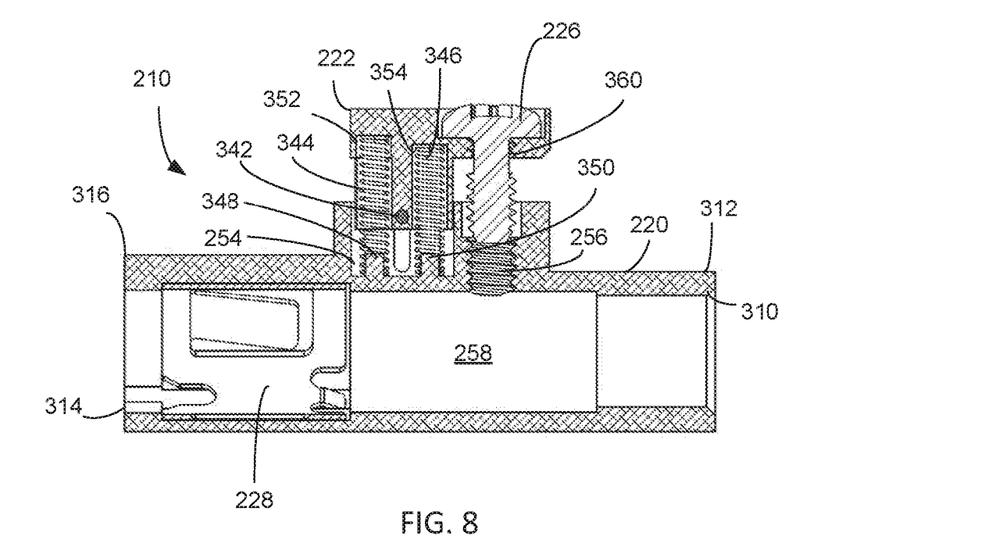
FIG. 8 is a cross-sectional view of the adapter taken along the line 8-8 in FIG. 7.
Figure 9:
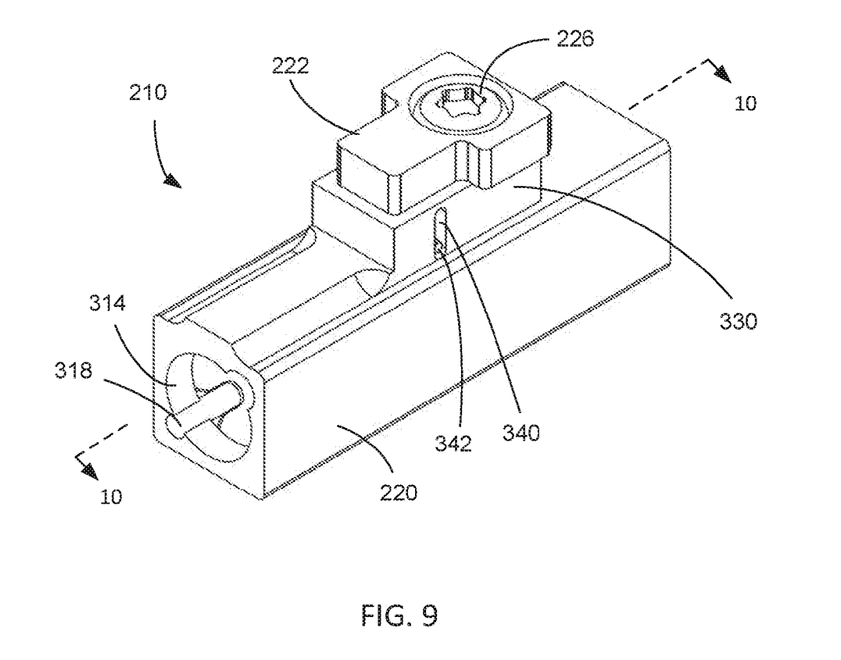
FIG. 9 is a perspective view of the locking fiber optic terminus adapter in a locked state.
Figure 10:
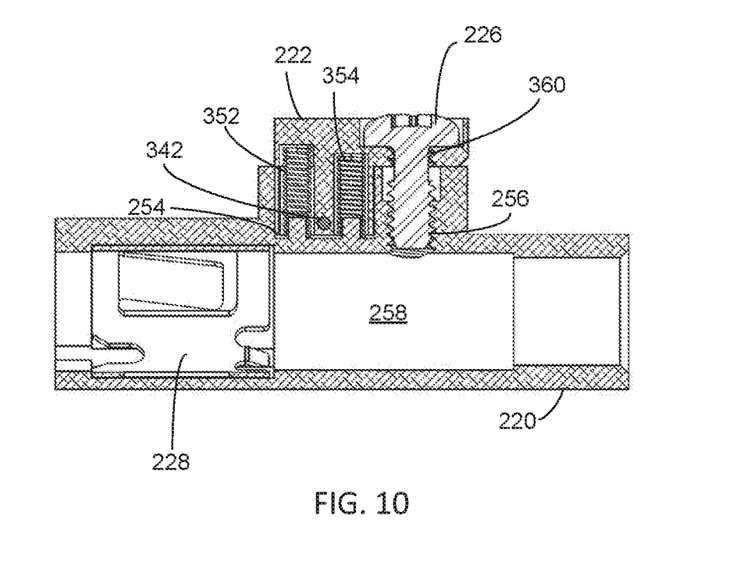
FIG. 10 is a cross-sectional view of the adapter taken along the line 10-10 in FIG. 9.

Referring initially to FIGS. 7 and 8, the fiber optic adapter 210 includes an adapter body 220 (also referred to herein as a housing), a tongue 222 (also referred to as a locking member), a securing member 226 (also referred to as a fastener), and a spring clip 228. Although not shown, a gasket may be provided as discussed above. The housing 220 has a longitudinal passage 258 extending between a first opening 310 at a first end 312 of the housing and a second opening 314 at a second end 316 of the housing. The passage 258 includes one or more notches 318 extending at least partially along the length of the passage.

The locking member 222, the securing member 226, and the housing 220 are captive with one another. In this manner, the locking member 222, the securing member 226, and the housing 220 may not be disassembled or separated from one another without intentional effort to remove one or both of the securing member 226 and the locking member 222 from the body 220. It is contemplated that intentional effort to separate the parts will require much different manipulation and/or much greater force than the adapter 210 would experience in normal operating conditions in any of the stages depicted in FIGS. 11-13.

In the illustrated embodiment, the mesa 330 has a receptacle 254 rearward of threaded opening 256, and one or more channels 340, such as slip fit channels in the side of the mesa 330. The receptacle 254 is open at the top of the mesa 330 and the post 252 of the locking member 222 fits in the receptacle 254. The post 252 includes an opening that receives a pin 342 after the post 252 has been fit into the receptacle 254, and the pin 342 is held in the opening in the post 252 by an interference fit to hold the post 252 in the receptacle 254 to create a captive assembly. Also preventing disengagement of the post 252 from the receptacle 254 is interaction of the securing member 226 with an upper portion of the opening 256.

The pin 342 is inserted through one of the channels 340 into the opening in the post 252, and the pin moves in the channels 340 during movement of the post 252. A bottom end of the channel 340 serves as a stop for the pin 342 (and thus the post 252) in the locked state and a top end of the channel 340 serves as a stop for the pin 342 in the normal state. In this way the pin 342 limits radial (e.g., upward and downward) movement of the locking member 222 relative to the housing 220. One or more springs, and in the illustrated embodiment two springs 344 and 346 bias the locking member 222 upward to a point where the pin 342 engages the top end of the channel 340. A lower end of each spring 344, 346 may surround a respective post 348, 350 in the receptacle 254 to retain the springs 344 and 346 in the receptacle 254. An upper end of each spring 344, 346 may be retained in a respective pocket 352, 354 of the post 252.

In one embodiment, an opening 360 in the locking member 222 that accommodates the securing member 226 is threaded. Also, a lower portion of securing member 226 is threaded and an upper portion of the securing member 226 between a head of the securing member 226 and the threaded portion is not threaded. Thus, once the post 252 is slid into the receptacle 254 and the end of the springs 344 and 346 are located around the posts 348 and 350 and in the respective pockets 352 and 354, the securing member 226 may be threaded through the opening 256. The securing member 226 may be threaded through the opening 256 until the unthreaded portion of the securing member 226 is adjacent the opening 256, which traps the securing member 226 in the locking member 222. Further capturing of the securing member 226 relative to the locking member 222 may be present to limit reversal of the securing member 226 out of the threaded opening 256.

The procedure to assemble the securing member 226 with the locking member 222 may be performed when the locking member 222 is elevated above the housing 220 (e.g., by force of the springs 344 and 346) to the limit imposed by the top end of the channel 240 serving as the upper stop. In this manner, the lower end of the securing member 226 is partially inserted into the upper portion of the opening 256 with sufficient interaction so that each of the securing member 226, the locking member 222, the springs 344 and 346 and the housing 220 are all captured with respect to one another. Also, the locking member 222 is positioned to allow the adapter 210 to be inserted into the receptacle 212 as shown and described with respect to FIGS. 11-13. Once the adapter 210 is inserted into the receptacle 212, the securing member 226 may be treaded deeper into the opening 256 and moved downward against the force of the springs 344 and 346 to compress the springs and effectuate bringing the portion 240 into position in the chamber 242 as depicted in FIG. 13.

Figures 11, 12:
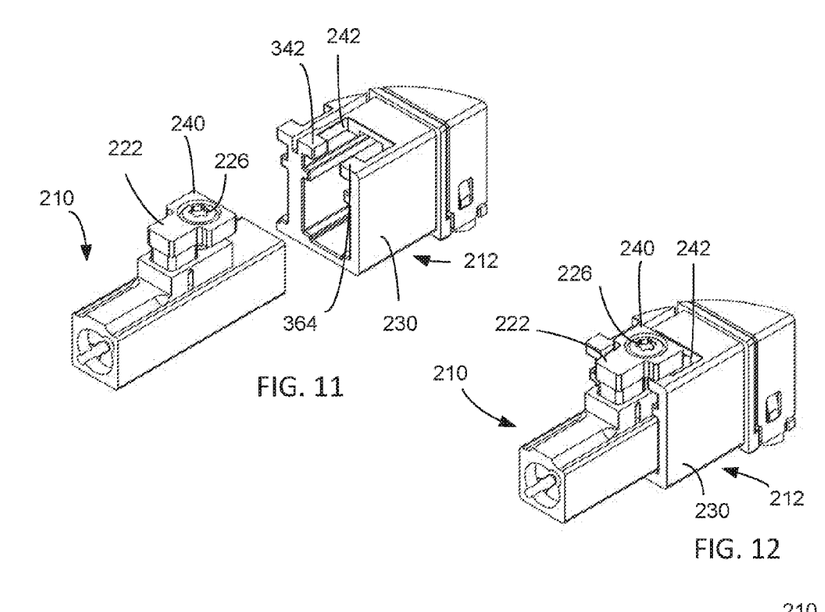
FIG. 11 is a perspective view of the adapter and coordinating receptacle.
FIG. 12 is a perspective view of the adapter in the default state inserted in the coordinating receptacle.
Figure 13:
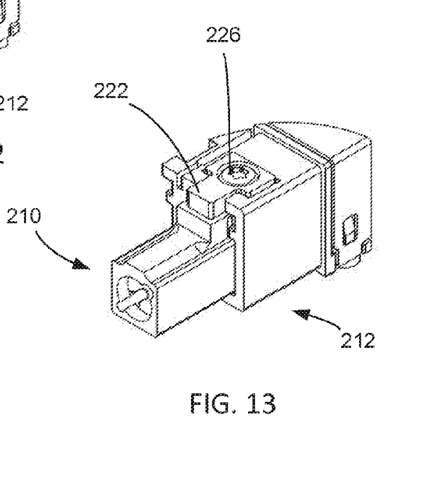
FIG. 13 is a perspective view of the adapter assembled with the coordinating receptacle.

Turning now to FIGS. 11-13, shown is a progression of assembly of the adapter 210 with the receptacle 212. In FIG. 11, the adapter 210 is disconnected from the receptacle 212. In FIG. 12, the adapter 210 is partially inserted into the receptacle 212. In FIG. 13, the adapter 210 is fully assembled with the receptacle 212. As illustrated, during assembly of the adapter 210 with the receptacle 212, the portion 240 of the locking member 222 that fits in the latch area chamber 242 to operatively lock the adapter 210 in the receptacle 212 moves over an upper exterior surface 362 of the housing 230 of the receptacle 212. The upper exterior surface 362 is on an upper wall 364 of the housing 230 in which the latch area chamber 242 is located. In this way, the upper wall 364 of the housing 230 is interposed between the portion 240 of the locking member 222 and the housing 220 of the adapter 210 before the portion 240 is aligned with the latch area chamber 242 and the portion 240 is moved toward the housing 220 so as to become located and secured in the latch area chamber 242.

Other embodiments are possible. For example, the post 252 may be snap fit into the receptacle 256. The snap fit is not easily reversed so as to trap the locking member 222 relative to the housing 220. The securing member 226 may be captured by the locking member 222. Enough freedom of vertical movement of the locking member 222 relative housing 220 may be present to allow for similar assembly of the adapter 210 receptacle 212 as described for the illustrated embodiment. A snap fit relationship may be facilitated by making one of both of the housing 220 and the locking member 222 of resilient material.

In the embodiments described in connection with FIGS. 7-13, the locking member 222 is considered a separate component from the housing 229, even though they have a captured relationship.

Additional aspects of the disclosure will be understood from the appended claims, which form part of this specification.

What is claimed is:
1. A fiber optic adapter, comprising:
a housing having a longitudinal passage extending between a first opening at a first end of the housing and a second opening at a second end of the housing, the housing sized to fit within a fiber optic receptacle;
a deflectable member in the longitudinal passage of the housing configured to retain a fiber optic terminus in the housing; and
a locking member interfaced with the housing and sized to fit within a retaining notch in the fiber optic receptacle to prevent separation of the housing from the receptacle,
wherein the deflectable member functions as a rearward direction stop for the terminus to bring a leading end of a fiber optic filament retained by the terminus into optical contact with an optical component retained by the fiber optic receptacle.

2. The adapter according to claim 1, wherein the deflectable member includes one or more inwardly biased deflectable fingers configured to be urged radially outward by the terminus when the terminus is inserted through the longitudinal passage.

3. A fiber optic adapter, comprising:
a housing having a longitudinal passage extending between a first opening at a first end of the housing and a second opening at a second end of the housing, the housing sized to fit within a fiber optic receptacle;
a deflectable member in the longitudinal passage of the housing configured to retain a fiber optic terminus in the housing; and
a locking member interfaced with the housing and sized to fit within a retaining notch in the fiber optic receptacle to prevent separation of the housing from the receptacle,
wherein the deflectable member includes one or more inwardly biased deflectable fingers configured to be urged radially outward by the terminus when the terminus is inserted through the longitudinal passage, and
wherein the fingers are configured to move radially inward to engage a rearward ledge of the terminus as the terminus moves through the longitudinal passage to prevent the terminus from being removed from the adapter.

4. A fiber optic adapter, comprising:
a housing having a longitudinal passage extending between a first opening at a first end of the housing and a second opening at a second end of the housing, the housing sized to fit within a fiber optic receptacle;
a deflectable member in the longitudinal passage of the housing configured to retain a fiber optic terminus in the housing; and
a locking member interfaced with the housing and sized to fit within a retaining notch in the fiber optic receptacle to prevent separation of the housing from the receptacle,
wherein the housing includes an inner wall that defines the longitudinal passage and a slot in the inner wall, and wherein the deflectable member interfaces with the slot to secure the deflectable member in the longitudinal passage.

5. The adapter according to claim 4, wherein the deflectable member is a c-shaped clip that snaps into the slot.

6. The adapter according to claim 1, wherein the locking member is a separate part from the housing.

7. The adapter according to claim 1, further including a sealing member secured to the housing to seal an optical path between the fiber optic terminus and an optical component in the fiber optic receptacle.

8. The adapter according to claim 7, wherein a portion of the sealing member is disposed in the longitudinal passage and a portion of the sealing member extends through the first opening and past the first end of the housing.

9. The adapter according to claim 8, wherein a portion of the sealing member extends through a third opening in the housing perpendicular the first opening.

10. The adapter according to claim 1, further including a securing member that secures the locking member to the housing.

11. The adapter according to claim 10, wherein the housing and the locking member each include an opening configured to be aligned with the other for receiving the securing member to secure the locking member to the housing.

12. The adapter according to claim 10, wherein the locking member includes a recess to accommodate a head of the securing member.

13. The adapter according to claim 1, wherein the longitudinal passage includes one or more notches extending at least partially along a length of the passage to serve as guides for a radially outwardly extending members of the fiber optic terminus.

14. The adapter according to claim 1, further including a securing member, wherein the locking member, the securing member, and the housing are captive with one another.

15. A fiber optic adapter, comprising:
a housing having a longitudinal passage extending between a first opening at a first end of the housing and a second opening at a second end of the housing, the housing sized to fit within and mate with a fiber optic receptacle that is configured to accept a fiber optic connector compliant with a first fiber optic connector standard; and
a deflectable member disposed in the longitudinal passage of the housing,
wherein the housing and deflectable member are configured to receive and retain a fiber optic connector compliant with a second fiber optic connector standard, and
wherein when the housing is within the fiber optic receptacle, a fiber optic filament of a fiber optic cable held by the fiber optic connector compliant with the second standard is optically coupled with an active or passive optical component retained by the receptacle.

16. The fiber optic adapter according to claim 15, wherein the deflectable member functions as a rearward direction stop for the fiber optic connector compliant with the second fiber optic connector standard to bring a leading edge of the fiber optic filament into optical contact with the active or passive optical component.

17. The fiber optic adapter according to claim 15, wherein the housing includes an inner wall that defines the longitudinal passage and a slot in the inner wall, and wherein the deflectable member interfaces with the slot to secure the deflectable member in the longitudinal passage.

18. The fiber optic adapter according to claim 15, wherein the longitudinal passage includes one or more notches extending at least partially along a length of the passage to serve as guides for a radially outwardly extending member of the fiber optic connector compliant with the second fiber optic connector standard.

19. The fiber optic adapter according to claim 15, wherein the deflectable member includes one or more inwardly biased deflectable fingers configured to be urged radially outward by the fiber optic connector compliant with a second fiber optic connector standard when the fiber optic connector is inserted through the longitudinal passage.

20. The fiber optic adapter according to claim 19, wherein the fingers are configured to move radially inward to engage a rearward ledge of the fiber optic connector as the fiber optic connector moves through the longitudinal passage to prevent the fiber optic connector from being removed from the adapter.

* * * * *